US008887061B2

(12) United States Patent
Zaman et al.

(10) Patent No.: US 8,887,061 B2
(45) Date of Patent: Nov. 11, 2014

(54) VARIABLE SCREEN MAGNIFIER USER INTERFACE

(75) Inventors: Nazia Zaman, Bellevue, WA (US); Harold S. Gomez, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 12/238,467

(22) Filed: Sep. 26, 2008

(65) Prior Publication Data

US 2010/0083192 A1  Apr. 1, 2010

(51) Int. Cl.
*G06F 3/00* (2006.01)
*G06F 3/0481* (2013.01)

(52) U.S. Cl.
CPC .... *G06F 3/0481* (2013.01); *G06F 2203/04805* (2013.01)
USPC ........................................................ 715/745

(58) Field of Classification Search
USPC ........................................................ 715/745
See application file for complete search history.

(56) References Cited

U.S. PATENT DOCUMENTS

| 5,736,974 | A | 4/1998 | Selker |
| 5,999,169 | A | 12/1999 | Lee |
| 6,404,423 | B1* | 6/2002 | Kivela et al. ................... 345/212 |
| 6,636,250 | B1 | 10/2003 | Gasser |
| 6,853,390 | B1 | 2/2005 | Wandersleben et al. |
| 6,957,392 | B2 | 10/2005 | Simister et al. |
| 7,194,697 | B2* | 3/2007 | Sinclair et al. ................. 715/800 |
| 2004/0117358 | A1 | 6/2004 | von Kaenel et al. |
| 2004/0268263 | A1* | 12/2004 | Van Dok et al. .............. 715/733 |
| 2006/0026535 | A1* | 2/2006 | Hotelling et al. ............. 715/863 |
| 2006/0074735 | A1 | 4/2006 | Shukla et al. |
| 2006/0101350 | A1 | 5/2006 | Scott |
| 2006/0250525 | A1* | 11/2006 | Plut ................................ 348/607 |
| 2007/0033544 | A1* | 2/2007 | Fleisher et al. ............... 715/800 |
| 2008/0040693 | A1 | 2/2008 | Toyama et al. |
| 2008/0102809 | A1* | 5/2008 | Beyer ........................... 455/420 |
| 2009/0089689 | A1* | 4/2009 | Clark et al. ................... 715/762 |
| 2009/0209239 | A1* | 8/2009 | Montesdeoca ............. 455/414.2 |

OTHER PUBLICATIONS

ZoomText Quick Reference Guide, Version 8.1, 2004.*
"Accessibility Tools", Retrieved at <<http://technet.microsoft.com/en-us/library/bb457128.aspx>>, Nov. 3, 2005, pp. 24.
Friesen, Brian, "Performance Computing", Retrieved at <<http://www.softpedia.com/get/Multimedia/Graphic/Graphic-Others/ZoomIn.shtml>>, Jun. 19, 2008, pp. 2.

* cited by examiner

*Primary Examiner* — Boris Pesin
*Assistant Examiner* — Matthew Ell
(74) *Attorney, Agent, or Firm* — Timothy Churna; Kate Drakos; Micky Minhas

(57) ABSTRACT

The magnifier interface system determines a level of user activity with a screen magnifier user interface and determines a current user interface mode. If the system is currently in the full mode and the level of user activity indicates user interaction with the screen magnifier user interface below a threshold, then the system transitions from the full mode to the watermark mode based on the lack of determined user activity. If the system is currently in the watermark mode and the level of user activity indicates user interaction with the screen magnifier user interface, then the system transitions from the watermark mode to the full mode based on the determined user activity. Thus, the magnifier interface system presents a full user interface that transitions into a smaller watermark interface when not in use to take up less screen real restate yet remain available to users.

20 Claims, 6 Drawing Sheets

VARIABLE SCREEN MAGNIFIER USER INTERFACE

BACKGROUND

Screen magnifiers are a type of assistive technology used by visually impaired people with some functional vision. By magnifying areas of the screen, the screen magnifier allows people that would otherwise not be able to see areas of the screen that are too small to enlarge these areas. Screen magnifiers are software applications that present a computer's graphical output in an enlarged form. Many screen magnifiers act similar to a physical magnifying glass that a user can move around over the screen to magnify a specific area, except rather than a physical object the screen magnifier is software and the user moves the displayed glass or lens with the mouse or other input device. The most common method of magnification is to present an enlarged view of a portion of the original screen content that covers a portion of or the entire screen. The enlarged view often tracks the pointer or cursor as the user moves a mouse or other input device around the screen so that the user can magnify different areas. Screen magnifiers may work with a single application or across multiple applications at the operating system level. For example, Microsoft Windows Vista includes a magnifier application for magnifying the entire desktop and any applications displayed on it.

A screen magnifier can be presented as a window that, when placed over other windows or the desktop, magnifies the contents of other windows. For example, the magnifier may act as a lens that can be moved around (i.e., panning) to enlarge various areas of the screen. A screen magnifier can also be displayed full screen, so that it takes up the entire display. In this mode, the display only shows a portion of the actual screen at a time. For example, at a magnification factor of 4 times (4×), only one-eighth of the desktop can be shown in a full screen magnifier at a time. Thus, to see the other three-fourths of the desktop a user moves the magnified area around in a process called panning.

One goal of a screen magnifier is to enlarge toolbar and other buttons and controls so that a visually impaired user can interact with applications. This includes the screen magnifier application itself, which typically displays a user interface for controlling aspects of the magnifier. For example, the user may interact with the user interface to modify the zoom level or set whether the magnifier takes up the full screen or displays a magnified view in a window. The screen magnifier may include a user interface that the magnifier keeps within the view so that the controls of the user interface are available to the user at any time.

Unfortunately, in larger magnification contexts the UI becomes obtrusive, because it consumes a significant portion of the screen. Even a small toolbar can be quite large when the user views the toolbar at, for example, a 16× zoom level. Although this helps the user to be able to see the screen magnifier controls, the user may no longer be able to see other applications or enough of other applications to perform typical operations. For example, a user viewing a list of files in a file management application may not be able to see a file and a folder that the user wants to drag the file into at the same time because of the limited amount of screen real estate. Thus, the user may find the screen magnifier's own user interface frustrating. Some screen magnifiers solve this by removing the UI from the screen and providing key sequences that the user memorizes to display the UI again. This approach is not accessible to new or novice users unfamiliar with the keyboard shortcuts, and may make the screen magnifier less accessible to a broad audience.

SUMMARY

A magnifier interface system is described that presents itself in a way that is less obtrusive to other magnified applications, but is still available for advanced control of the screen magnifier at the user's request. The magnifier interface system determines a level of user activity with a currently displayed user interface and determines a current user interface mode. If the system is currently in the full mode and the level of user activity indicates user interaction with the currently displayed user interface below a threshold, then the system transitions from the full mode to the watermark mode based on the lack of determined user activity. If the system is currently in the watermark mode and the level of user activity indicates user interaction with the currently displayed user interface, then the system transitions from the watermark mode to the full mode based on the determined user activity. The system displays whichever user interface is active at any particular time. Thus, the magnifier interface system presents a full user interface that transitions into a smaller watermark interface when not in use to take up less screen real restate yet remain available to users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A magnifier interface system is described that presents itself in a way that is less obtrusive to other magnified applications, but is still available for advanced control of the screen magnifier at the user's request. The magnifier interface system determines a level of user activity with a currently displayed user interface. For example, the system may determine whether the user has clicked on the user interface in the last few seconds. The system also determines a current user interface mode. For example, the system may have two modes: a full, larger user interface and a smaller watermark user interface. If the system is currently in the full mode and the level of user activity indicates user interaction with the currently displayed user interface below a threshold, then the system transitions from the full mode to the watermark mode based on the lack of determined user activity. For example, the user may be interacting with other applications in the magnified view, and by reducing its own user interface size the magnifier interface system gives the user more of the magnified view to see the other applications.

If the system is currently in the watermark mode and the level of user activity indicates user interaction with the currently displayed user interface, then the system transitions from the watermark mode to the full mode based on the determined user activity. For example, the user may click on the watermark user interface to get to the full user interface and adjust the magnification level or other magnification settings. The system displays whichever user interface is active at any particular time. The system may transition back and forth between the watermark user interface and the full user interface repeatedly based on user activity. Thus, the magnifier interface system presents a full user interface that transitions into a smaller watermark interface when not in use to take up less screen real restate yet remain available to users. The watermark interface stays on the screen to provide an indication to users that additional controls are available and does not burden users with learning unfamiliar keyboard shortcuts.

Figure 1:
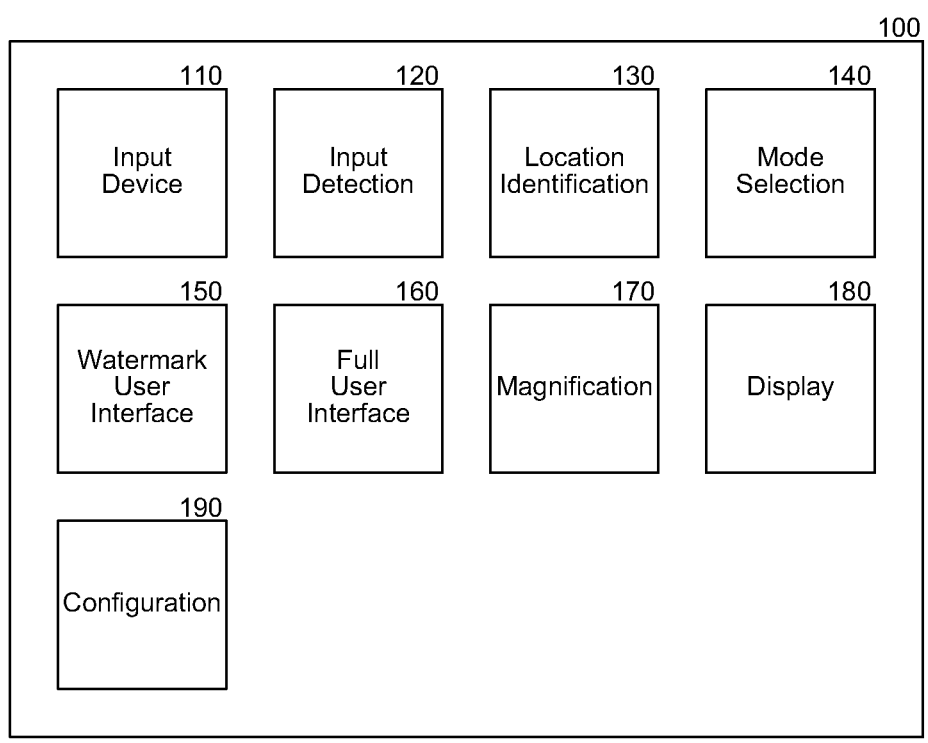
FIG. 1 is a block diagram that illustrates the components of the magnifier interface system, in one embodiment.

FIG. 1 is a block diagram that illustrates the components of the magnifier interface system, in one embodiment. The magnifier interface system 100 includes at least one input device 110, an input detection component 120, a location identification component 130, a mode selection component 140, a watermark user interface component 150, a full user interface component 160, a magnification component 170, a display 180, and a configuration component 190. Each of these components is described in further detail herein.

The input device 110 receives input from a user and communicates the input to an operating system. The input device can be a variety of devices such as a stylus, digital pen, mouse, or even the user's finger moving over a touch screen. When the system 100 receives a mouse message (e.g., WM_LBUT-TONDOWN), it may call the Win32 API GetMessageExtraInfo to evaluate whether the message originated from a pen or a mouse device. The Win32 API provides a macro IsPenEvent that masks the value returned from GetMessageExtraInfo to determine the type of input received. If the macro returns true, then a pen or touch screen generated the message. Otherwise, a mouse device generated the message.

The input detection component 120 converts the received input into coordinates of a displayed cursor. When a user moves the input device 110, the input detection component 120 moves the displayed cursor. The location identification component 130 identifies one or more user interface elements present at a current location of the displayed cursor. For example, the location identification component 130 may determine that the current location of the cursor is hovering over the watermark user interface displayed by the system 100. As another example, the location identification component 130 may determine that the current location of the cursor is away from the full user interface displayed by the system. For example, the user may be interacting with user interface elements of a magnified application.

The mode selection component 140 selects between a watermark user interface and a full user interface, based on the time since the cursor was last near or interacting with the user interface. The component 140 may include a timer and store historical data of the user's interaction with the user interface. If the system 100 is displaying the full user interface and the cursor has not been near the user interface for a threshold amount of time (e.g., five seconds), then the mode selection component 140 selects the watermark user interface to display instead of the full user interface. Conversely, if the system 100 is displaying the watermark user interface and the user brings the cursor near (e.g., within 100 pixels or over) the watermark user interface, then the model selection component 140 selects the full user interface to display instead of the watermark user interface.

The watermark user interface component 150 renders the watermark user interface. For example, the component 150 may draw an icon for the watermark user interface. The component 150 also manages transition effects, such as fading the watermark user interface in or out based on user activity. The component 150 may also scale the watermark user interface to a different zoom level than other contents of the magnified view to allow more of the other contents to be visible. Moreover, the component 150 may render the watermark user interface with less than 100% opacity (e.g., translucent) so that the user can see through the user interface to see more of the other contents of the magnified view.

The full user interface component 160 renders the full user interface. For example, the component 160 may draw a toolbar for the full user interface. The component 160 also manages transition effects, such as fading the full user interface in or out based on user activity. For example, when the user clicks on the watermark user interface, the system 100 fades in the full user interface. The component 160 may also scale the full user interface to a different zoom level than other contents of the magnified view to allow more of the other contents to be visible. Moreover, the component 160 may render the full user interface with less than 100% opacity (e.g., translucent) so that the user can see through the user interface to see more of the other contents of the magnified view.

The display 180 displays a graphical representation of one or more applications and a magnified view of at least a portion of the graphical representation. For example, the display 180 may display a desktop of the operating system and applications that are currently running as windows on the desktop. The user may select an area of the graphical representation that the system 100 will magnify by panning the magnified area. The magnification component 170 generates the magnified view from a selected area of the graphical representation. When the user pans the magnified area, the magnification 170 component performs graphical operations, such as a stretch blit, to display a larger than usual view of the selected area.

The configuration component 190 receives configuration information from the user. For example, the user may disable the watermark user interface so that the system 100 only displays the full user interface. As another example, the user may configure a magnification factor (i.e., zoom level) for the system 100 user interface that is different (e.g., smaller) that that of the magnified view.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
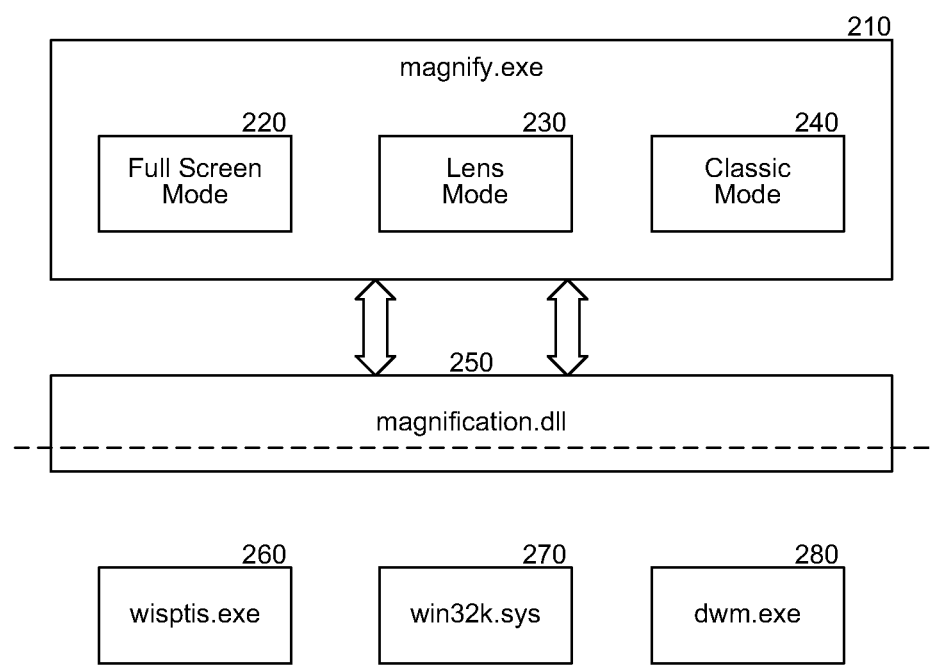
FIG. 2 is a block diagram that illustrates a Microsoft Windows-based operating environment of the magnifier interface system, in one embodiment.

FIG. 2 is a block diagram that illustrates a Microsoft Windows-based operating environment of the magnifier interface system, in one embodiment. The system includes an executable file 210, a supporting dynamic-link library 250, and three modules provided by the operating system, wisptis.exe 260, win32k.sys 270, and dwm.exe 280. The executable file 210, called magnify.exe, creates the process that controls the user interface and provides the end-to-end user experience. The magnifier.exe process controls the magnification, keeps track of input events, and moves the magnified view accordingly. The executable file 210 may provide three modes, full-screen mode 220, lens mode 230, and legacy mode 240. The full-screen mode 220 projects a magnified version of the user's desktop on the display device. One can picture it as a huge magnifier lens that covers the entire display. The lens mode 230 displays a magnified view of the desktop in a window that is smaller than the size of the display. This mode acts more like a traditional physical magnifying glass that a user can move around the desktop. The legacy mode 240 provides magnification with reduced functionality, such as when certain operating system services (e.g., dwm.exe) are not available. For example, during logon Microsoft Windows does not provide access to certain services to applications.

The dynamic-link library 250, magnification.dll, provides an application-programming interface (API) exposed to internal and external magnification controllers. The executable file 210 magnify.exe and other applications call this API to request various magnification services. The dynamic-link library 250 acts as a proxy between the magnification controller, the kernel-mode state for the magnification context, and the desktop compositor.

Win32k.sys 270 is a kernel-mode driver that handles the bulk of the Win32 API on Microsoft Windows. Win32k.sys 270 includes a Raw Input Thread (RIT) that handles input processing for the magnifier interface system. Win32k.sys 270 also handles security and context control. Dwm.exe 280 provides the DWM process that keeps track of application and other windows. Dwm.exe 280 handles the output compositing and magnification for the magnifier interface system. Wisptis.exe 260 is responsible for input to a tablet via a stylus or touch and consumes input transformation functions provided by Win32k.sys 270 to transform absolute clicking to work in magnified contexts (e.g., what you see is what you click).

Figure 3:
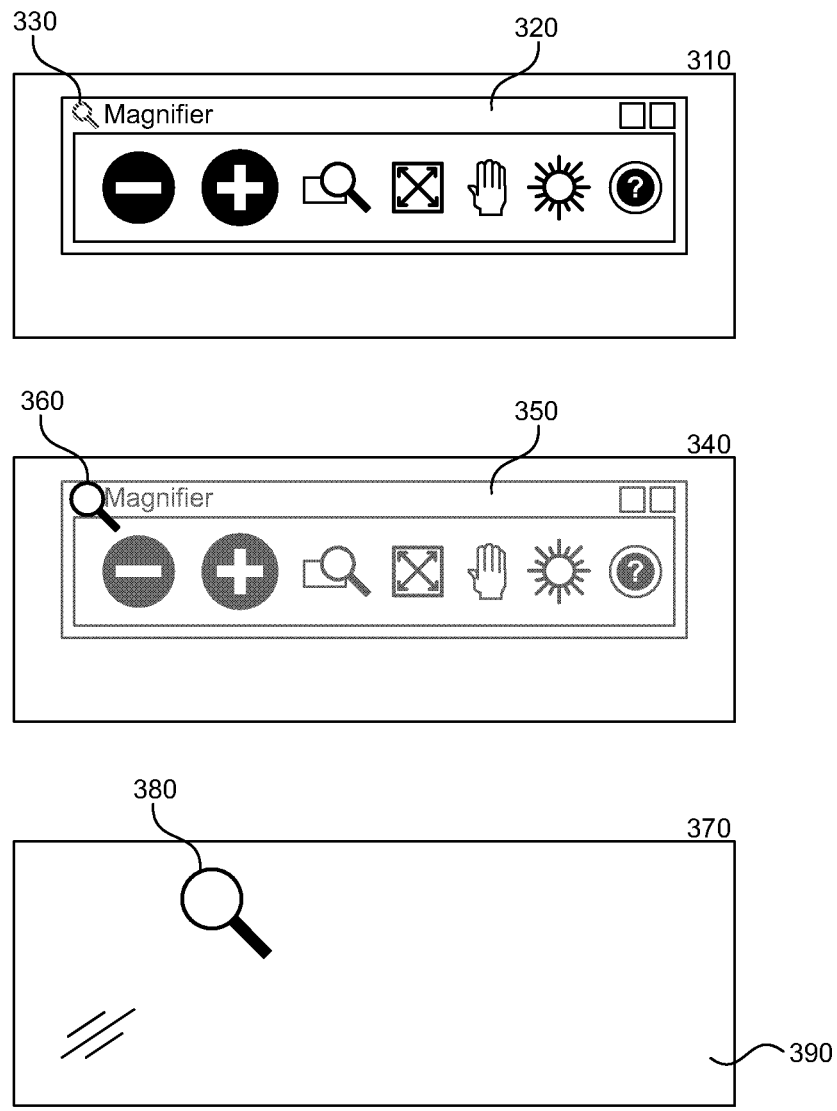
FIG. 3 is a display diagram that illustrates three states of the user interface of the magnifier interface system, in one embodiment.

FIG. 3 is a display diagram that illustrates three states of the user interface of the magnifier interface system, in one embodiment. The first state 310 illustrates the full user interface 320 at its full opacity. The full user interface 320 contains a small icon 330 in the title bar that will appear to expand to become the watermark user interface. The second state 340 illustrates the magnifier interface system mid-transition between the full and watermark user interface. The full user interface 350 is at 50% opacity as it fades out, and the watermark user interface 360 is getting bigger as it becomes the active user interface. The third state 370 shows that the full user interface is no longer visible and the watermark user interface 380 is at its full size. The watermark user interface 380 is much smaller than the full user interface 320 and allows the user to see more of the magnified view 390 will retaining access to the full user interface 320 if requested (e.g., by hovering over or clicking on the watermark user interface 380).

Figure 4:
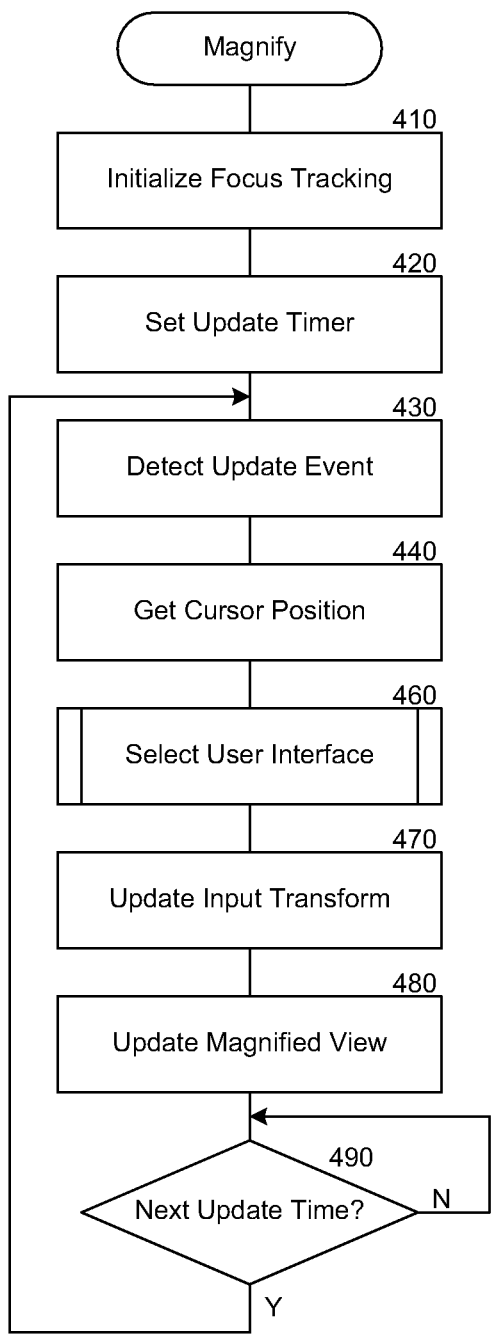
FIG. 4 is a flow diagram that illustrates the processing of the system to magnify an area of the screen, in one embodiment.

FIG. 4 is a flow diagram that illustrates the processing of the system to magnify an area of the screen, in one embodiment. In block 410, the system initializes focus tracking so that the magnified view can follow the focus if desired by the user. For example, the user may want the system to magnify whatever user interface elements (e.g., menu's buttons and so on) have the focus at any given time. In block 420, the system starts an update timer that fires to kick off an update of the position and contents of the magnified view. For example, the update timer may fire every 15 ms and modify the magnified view based on actions initiated by the user since the last update. This step is optional and may not occur if the system is operating based on events rather than a timer. For example, for mouse movements the system can use a low-level mouse hook to detect mouse events. For focus tracking the system can use WinEvents (e.g., via SetWinEventHook) or other methods provided by the operating system. In block 430, the system detects an update event, such as expiration of the timer described, or in some cases, user actions trigger updates. For example, the system may receive a notification that the timer has fired. In block 440, the system retrieves the current cursor position. For example, the system may call an operating system API (e.g., GetCursorPos) to retrieve the location of the cursor.

Figure 5:
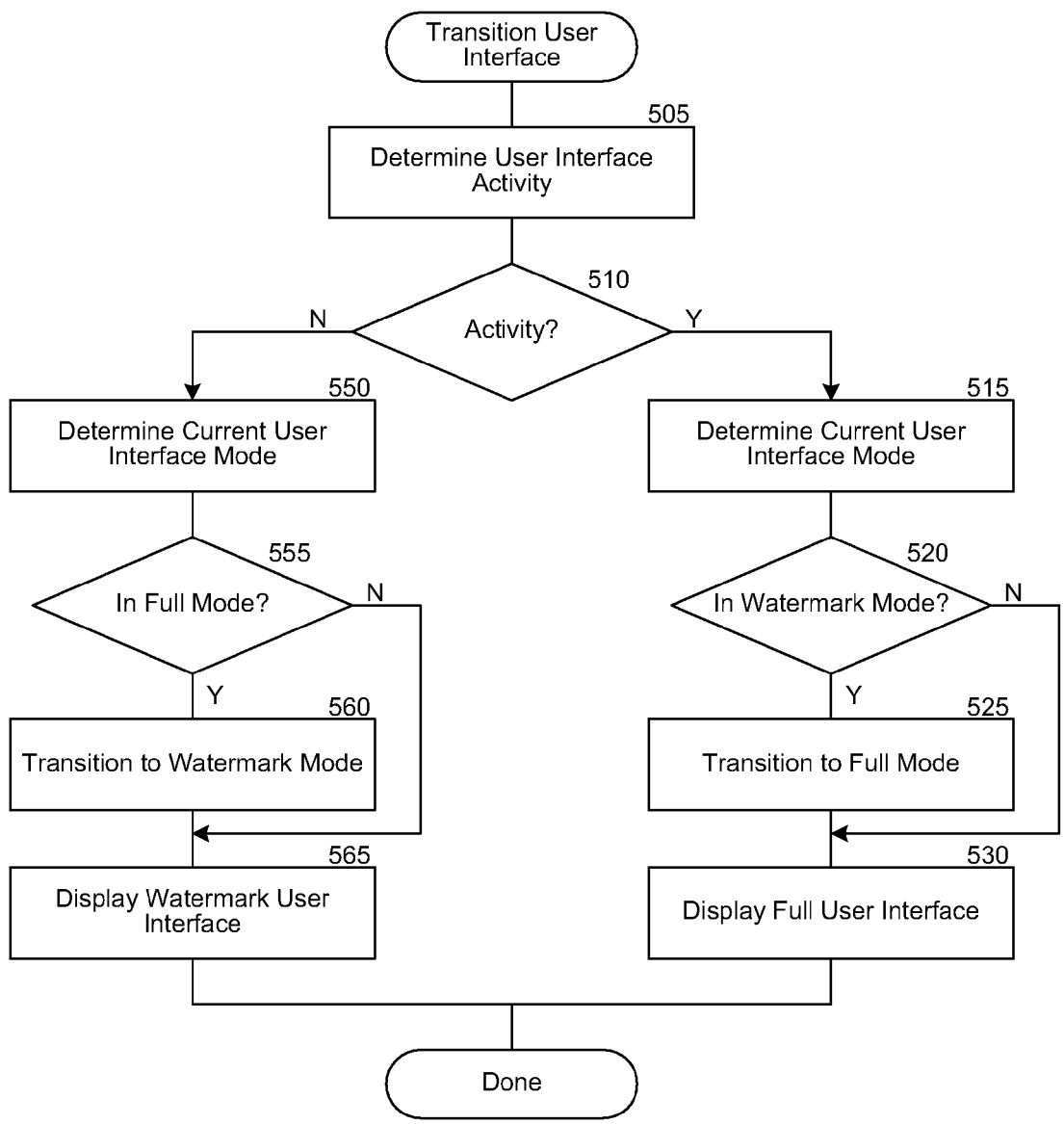
FIG. 5 is a flow diagram that illustrates the processing of the mode selection component to determine which user interface to display, in one embodiment.

In block 450, the system determines whether to display the watermark user interface or the full user interface as described further with reference to FIG. 5. In block 470, the system updates the input transform. For example, the system may retrieve the contents of the screen that the magnified view is to magnify. In block 480, the system updates the magnified view (including displaying the selected user interface). For example, the system may keep the magnified view in the right place and at the right zoom level. In decision block 490, the system determines if the next update interval has started based on the update timer or user actions. If it is time for the next update interval, the system loops to block 430 to handle the next update, else the system waits for an update event.

FIG. 5 is a flow diagram that illustrates the processing of the mode selection component to determine which user interface to display, in one embodiment. In block 505, the component determines the level of user activity with the displayed user interface. For example, the component may receive the current cursor coordinates and historical information about the last time the user interacted with the user interface. In decision block 510, if there is current activity or activity within a threshold amount of time, then the component continues at block 515, else the component continues at block 550.

In block 515, the component determines the current user interface mode. For example, if the system has just started then the system may default to the full user interface mode. In decision block 520, if the system is currently in the watermark mode, then the component continues at block 525, else the component continues at block 530. In block 525, the component transitions from the watermark mode to the full mode based on the detected user activity. For example, the user may have clicked on the watermark user interface. In block 530, the component displays the full user interface. For example, the component may display a toolbar at the upper right of the magnified view. After block 530, these steps conclude.

In block 550, the component determines the current user interface mode. For example, if the system has been idle for several minutes, then the system may be in the watermark user interface mode. In decision block 555, if the system is currently in the full mode, then the component continues at block 560, else the component continues at block 565. In block 560, the component transitions from the full mode to the watermark mode based on the lack of detected user activity. For example, the user may be interacting with another application in the magnified view and not clicked on the full user interface for some time (e.g., more than five seconds). In block 565, the component displays the watermark user interface. For example, the component may display an icon at the upper right of the magnified view. After block 565, these steps conclude.

In some embodiments, the magnifier interface system keeps the user interface at the same position on the display regardless of where the user pans the magnified view. For example, the system may draw the user interface (whether the watermark or full user interface) at the upper right of the display. One way to think of the user interface is like a smudge on a physical magnifying glass lens. Although a user moves the lens around and magnifies different things, the smudge remains in the same place. Similarly, although the user pans the magnified view around the screen, the user interface stays in the same part of the display while the magnified view's contents change.

In some embodiments, the magnifier interface system magnifies its own user interface at a lower magnification factor than other applications in the magnified view. For example, the system may use half the magnification factor of other content. This keeps the magnifier user interface small and allows more of the content of other applications to be visible in the magnified view.

In some embodiments, the magnifier interface system's user interface starts out at same magnification factor as other applications, but reduces in size when not in use. For example, the system may magnify content at 8× and reduce the magnifier user interface from 8× to 4× over time based on user activity.

In some embodiments, the magnifier interface system displays the watermark and/or full user interface at less than 100% opacity (i.e., translucent) so that the user can see other content through it. For example, the magnifier user interface may appear like a sheet of glass that the user can see through but that also contains controls etched on it. Although the user interface is visible, the user can see enough of the content beneath it to be helpful while still being able to manipulate the magnifier's controls if desired.

In some embodiments, the magnifier interface system highlights the watermark user interface when the user hovers over it. The user may not know that he/she can click on the watermark user interface to display the full user interface. By highlighting or flashing the watermark user interface when the user gets near it or hovers over it, the system gives the user an indication that the watermark user interface is an interactive element that the user can click.

In some embodiments, the magnifier interface system fades out the full user interface while fading in the watermark interface. For example, the magnifier interface system can use layered windows and vary the opacity of each layer in opposite directions to provide the fade out/fade in effect to the user. The system can set a timer and change the opacity by an amount (e.g., 10%) for each firing of the timer, so that the user interface completely transitions within a set time (e.g., two seconds).

In some embodiments, the watermark user interface is a portion of the full user interface that becomes larger when the system fades out the full user interface. For example, the watermark user interface may be an icon in the title bar of the full user interface that enlarges to make up the watermark user interface. This reinforces to the user that the watermark user interface is associated with the full user interface and educates the user that clicking on the watermark user interface will bring back the full user interface.

In some embodiments, the magnifier interface system transitions from the watermark user interface to the full user interface when the system detects a change in focus to the magnifier application. For example, Microsoft Windows allows a user to explicitly select which application has the focus by pressing the Alt+Tab key combination. If the user selects the magnifier application in this way and the user interface is currently in the watermark mode, the system treats this as interaction with the user interface (just like hovering or clicking) that causes the user interface to transition from the watermark to the full mode.

In some embodiments, the magnifier interface system displays extra information in the watermark user interface. For example, rather than a simple icon the system may display the magnification factor within the watermark user interface. This can give the user information that the user may be interested in, without opening the full user interface and obscuring more of the magnified view.

In some embodiments, the magnifier interface system uses vector graphics for the user interface of the screen magnifier. Vector graphics do not lose quality regardless of the size at which the system displays them. Typical magnified content becomes grainy or jagged as it becomes larger and the individual pixels that make up the content begin to show. Vector graphics can be scaled to any size without becoming grainy or jagged. Thus, the magnifier interface system can use vector graphics for its own interface to ensure an attractive and easy to view appearance to the magnifier user interface at any magnification level.

In some embodiments, the magnifier interface system stores configuration information that a user can modify to alter the behavior of the system. For example, the user may be able to select the duration described herein for the elasticity of moving the window. As another example, the user may be able to configure where the system positions the magnifier user interface within the magnified view. The system may also allow the user to turn off the watermark user interface and have the system only use the full user interface. In some embodiments, the user can configure how long the system displays the full user interface before transitioning to the watermark user interface.

Figure 6:
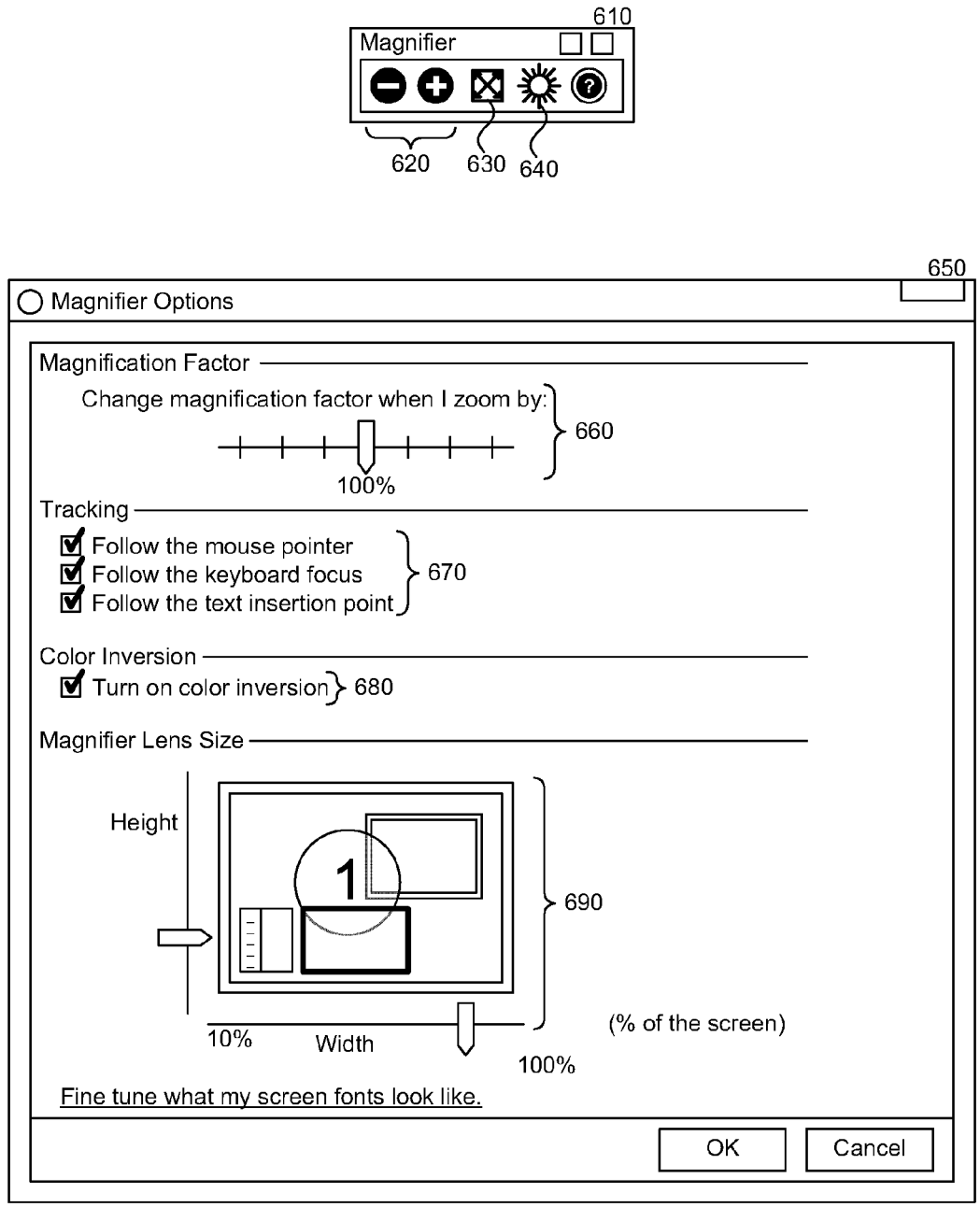
FIG. 6 is a display diagram that illustrates displays produced by the system for receiving configuration information from a user, in one embodiment.

FIG. 6 is a display diagram that illustrates displays produced by the system for receiving configuration information from a user, in one embodiment. The display 610 is a toolbar that the system may display when the system is currently magnifying a portion of the screen. The toolbar may appear only in the lens mode or in other modes as well. The toolbar contains buttons 620 for changing the magnification level (i.e., zooming in or out), a button 630 for switching between full-screen and lens mode, and an options button 640 for displaying the configuration dialog box 650. The configuration dialog box 650 contains more extensive configuration options. The configuration dialog box 650 includes a similar control 660 for changing the magnification level, as well as options 670 for changing how the magnified view behaves (e.g., focus following, cursor following), an option 680 for inverting colors (e.g., a useful visual aid for vision-impaired users), and controls 690 for setting the size of the magnified view lens.

From the foregoing, it will be appreciated that specific embodiments of the magnifier interface system have been described herein for purposes of illustration, but that various modifications may be made without deviating from the spirit and scope of the invention. Accordingly, the invention is not limited except as by the appended claims.

We claim:

1. A computer-implemented method for transitioning between a watermark and full user interface for a screen magnifier, the method comprising:
   determining a level of user activity with a currently displayed user interface of a magnifier application that is magnifying a second application;
   determining a current user interface mode of the magnifier application;
   if the determined current user interface mode is a watermark mode and the level of user activity indicates user interaction with the currently displayed user interface, transitioning from the watermark mode to the full mode based on the determined user activity;
   if the determined current user interface mode is a full mode and the level of user activity indicates user interaction with the currently displayed user interface below a threshold, transitioning from the full mode to the watermark mode based on the lack of determined user activity, wherein the watermark mode displays fewer controls than the full mode positioned over a magnified view of the second application and moves with the magnified view, such that during periods in which the user is interacting with the second application's interface, the interface of the magnifier application is reduced by entering the watermark mode to display more of the second application's interface, and during periods in which the user is interacting with the magnifier application's interface, the magnifier application displays the full mode which provides access to more controls; and
   displaying a user interface based on the current user interface mode.

2. The method of claim 1 wherein determining the level of user activity comprises determining whether a threshold amount of time has passed since the user last clicked on the currently displayed user interface.

3. The method of claim 1 wherein user interaction with the currently displayed user interface comprises a user clicking on the watermark user interface.

4. The method of claim 1 wherein user interaction with the currently displayed user interface below a threshold comprises detecting no user activity within a predetermined amount of time.

5. The method of claim 1 wherein displaying a user interface comprises displaying the user interface at a same location within a magnified view as contents of the magnified view change.

6. The method of claim 1 wherein transitioning from the full mode to the watermark mode comprises fading out the full user interface and fading in the watermark user interface at the same time.

7. The method of claim 1, wherein the magnifier application highlights the watermark mode when the user hovers over the watermark mode.

8. The method of claim 1, wherein the watermark mode displays a magnification factor.

9. A computing device including a central processing unit having stored computer executable instructions that when executed by the central processing unit of the computing device perform operations comprising:
   determining a level of user activity with a currently displayed user interface of a magnifier application that is magnifying a second application;
   determining a current user interface mode of the magnifier application;
   if the determined current user interface mode is a watermark mode and the level of user activity indicates user interaction with the currently displayed user interface, transitioning from the watermark mode to the full mode based on the determined user activity;
   if the determined current user interface mode is a full mode and the level of user activity indicates user interaction with the currently displayed user interface below a threshold, transitioning from the full mode to the watermark mode based on the lack of determined user activity, wherein the watermark mode displays fewer controls than the full mode positioned over a magnified view of the second application and moves with the magnified view, such that during periods in which the user is interacting with the second application's interface, the interface of the magnifier application is reduced by entering the watermark mode to display more of the second application's interface, and during periods in which the user is interacting with the magnifier application's interface, the magnifier application displays the full mode which provides access to more controls; and
   displaying a user interface based on the current user interface mode.

10. The computing device of claim 9 wherein determining the level of user activity comprises determining whether a threshold amount of time has passed since the user last clicked on the currently displayed user interface.

11. The computing device of claim 9 wherein user interaction with the currently displayed user interface comprises a user clicking on the watermark user interface.

12. The computing device of claim 9 wherein user interaction with the currently displayed user interface below a threshold comprises detecting no user activity within a predetermined amount of time.

13. The computing device of claim 9 wherein displaying a user interface comprises displaying the user interface at a same location within a magnified view as contents of the magnified view change.

14. The computing device of claim 9 wherein transitioning from the full mode to the watermark mode comprises fading out the full user interface and fading in the watermark user interface at the same time.

15. A computer system for providing a variable user interface for a screen magnifier, the system comprising:
   a central processing unit that detects a level of user activity with a currently displayed user interface of a magnifier application that is magnifying a second application, and determines a current user interface mode of the magnifier application,
   if the determined current user interface mode is a watermark mode and the level of user activity indicates user interaction with the currently displayed user interface, transitioning from the watermark mode to the full mode based on the determined user activity, and if the determined current user interface mode is a full mode and the level of user activity indicates user interaction with the currently displayed user interface below a threshold, transitioning from the full mode to the watermark mode based on the lack of determined user activity, wherein the watermark mode displays fewer controls than the full mode positioned over a magnified view of the second application and moves with the magnified view, such that during periods in which the user is interacting with the second application's interface, the interface of the magnifier application is reduced by entering the watermark mode to display more of the second application's interface, and during periods in which the user is interacting with the magnifier application's interface, the magnifier application displays the full mode which provides access to more controls; and a display that displays a user interface based on the current user interface mode.

16. The system of claim 15 wherein the central processing unit determines whether a threshold amount of time has passed since the user last clicked on the currently displayed user interface.

17. The system of claim 15 wherein user interaction with the currently displayed user interface comprises a user clicking on the watermark user interface.

18. The system of claim 15 wherein user interaction with the currently displayed user interface below a threshold comprises detecting no user activity within a predetermined amount of time.

19. The system of claim 15 wherein the display displays the user interface at a same location within a magnified view as contents of the magnified view change.

20. The system of claim 15 wherein the display fades out the full user interface and fading in the watermark user interface at the same time.

* * * * *